United States Patent
Gatton et al.

(10) Patent No.: US 8,204,900 B2
(45) Date of Patent: Jun. 19, 2012

(54) METRICS LIBRARY

(75) Inventors: Philip Jordan Gatton, Louisville, KY (US); Jeremy Joseph Williams, Spokane, WA (US)

(73) Assignee: Bank of America Corporation, Charlotte, NC (US)

( * ) Notice: Subject to any disclaimer, the term of this patent is extended or adjusted under 35 U.S.C. 154(b) by 268 days.

(21) Appl. No.: 12/469,813

(22) Filed: May 21, 2009

(65) Prior Publication Data
US 2010/0299351 A1    Nov. 25, 2010

(51) Int. Cl.
    *G06F 7/00* (2006.01)
(52) U.S. Cl. ........................................ 707/769
(58) Field of Classification Search ........... 707/707, 707/769, E17.014, E17.016, E17.017, 999.003; 702/179; 705/7.11, 7.12, 7.15, 7.17, 7.23, 705/7.25, 7.27, 7.38, 7.39, 7.41, 7.42, FOR. 110
    See application file for complete search history.

(56) References Cited

U.S. PATENT DOCUMENTS

| | | | |
|---|---|---|---|
| 7,031,953 B2 * | 4/2006 | Shah et al. | 707/769 |
| 7,130,812 B1 * | 10/2006 | Iyer et al. | 705/7.11 |
| 7,480,647 B1 * | 1/2009 | Murstein et al. | 1/1 |
| 7,685,083 B2 * | 3/2010 | Fairweather | 706/45 |
| 7,870,253 B2 * | 1/2011 | Muilenburg et al. | 709/224 |
| 2004/0010441 A1 * | 1/2004 | Nandigama et al. | 705/10 |
| 2004/0078224 A1 * | 4/2004 | Schramm-Apple et al. | 705/2 |
| 2004/0117242 A1 * | 6/2004 | Conrad et al. | 705/11 |
| 2005/0149496 A1 * | 7/2005 | Mukherjee et al. | 707/3 |
| 2006/0155697 A1 | 7/2006 | Rosengard | |
| 2007/0038676 A1 * | 2/2007 | Nagral et al. | 707/104.1 |
| 2007/0118531 A1 * | 5/2007 | Gatton et al. | 707/10 |
| 2010/0185656 A1 * | 7/2010 | Pollard | 707/769 |
| 2011/0179075 A1 * | 7/2011 | Kikuchi et al. | 707/769 |

OTHER PUBLICATIONS

International Search Report and the Written Opinion of the International Searching Authority mailed Jul. 29, 2010 for International Application No. PCT/US 10/35822.
International Preliminary Report on Patentability for International Application No. PCT/US2010/035822 mailed Dec. 1, 2011.

* cited by examiner

*Primary Examiner* — Robert Timblin
*Assistant Examiner* — Randall Burns
(74) *Attorney, Agent, or Firm* — Michael A. Springs; Moore & Van Allen PLLC; Jeffrey R. Gray

(57) ABSTRACT

Embodiments of the present invention relate to a metrics library system (MLS) for creating and storing complex search queries in a searchable repository. Embodiments of the present invention provide an MLS comprising a user interface for entering a user login, a defined metric query store, a metric definition interface, at least two disparate data stores, a query execution function, a metric library interface, and a user interface for directing data retrieved by the query execution function to a location specified by the user. In some embodiments, the MLS further provides a metrics usage history.

23 Claims, 7 Drawing Sheets

FIG. 5

| Usage Statistics | | | | | |
|---|---|---|---|---|---|
| Select a Metric: | Pend Team Productivity ▼ | | Search | | |
| Usage Statistics — 504 | | 506 | 508 | 510 | 512 |
| Metric Name | Aliases | Time Accessed | Times Used As Is | Times Modified | |
| Pend Team Productivity | Pend Team Volume | 5 | 2 | 3 | |
| Details — 514 | | | | | |
| xxxxxxxx  1/2/2009 9:01:02 AM | | Yes | No | | |
| xxxxxxxx  1/14/2009 3:15:23 PM | | No | Yes | | |
| xxxxxxxx  1/14/2009 3:21:56 PM | | No | Yes | | |
| xxxxxxxx  1/27/2009 10:01:01 AM | | No | Yes | | |
| xxxxxxxx  2/2/2009 8:57:43 AM | | Yes | No | | |

METRICS LIBRARY

BACKGROUND

Corporations and other types of organizations collect and store large amounts of data in order to manage processes and to monitor efficiency, productivity, and accuracy. The data tends to be managed by subgroups within the organization, often leading to non-warehoused data stored in disparate systems. Further, even in organizations wherein there is an effort to integrate data across subgroups, the benefits do not necessarily outweigh the costs. The collection and storage of data is an ongoing dynamic process, and sometimes an organization's data stores receive an influx of data from another source, such as when there is a merger with or acquisition of another organization. There are situations in which it is never cost-effective or realistic in terms of timeliness to fully integrate an organization's data systems.

Data that is useful to one subgroup is almost always of interest to at least one other group within the organization. However, it can be challenging to locate and retrieve non-warehoused data that is stored in disparate systems. Subgroups may therefore collect and store the same data redundantly, and may also expend resources crafting ways to search for and retrieve data that has already been retrieved by another subgroup. Thus, there is duplicative effort in collecting and storing commonly used data, and further duplicative effort in searching for data stored in disparate systems.

SUMMARY

Embodiments of the present invention provide a metrics library system (MLS) for creating and storing complex search queries in a searchable repository. Embodiments of the present invention provide an MLS comprising a user interface for entering a user login, a metric definition interface, a defined metric query store, a metric library interface, a query execution function, at least two disparate data stores, and a user interface for directing data retrieved by the query execution function to a location specified by the user. In some embodiments, the user login is used to establish the user's level of access to data.

In at least some embodiments, the user interface for entering a query enables the user to select from the group consisting of running an existing query, modifying and running an existing query, and creating and running a new query.

In at least some embodiments, the metric query store comprises at least one of query name, query keywords, query text description, data sources (and aliases) used, data tables (and aliases) used, data fields (and aliases) used, external relationships created, criteria and filtering information, and raw SQL string.

In at least some embodiments, the MLS further comprises a metrics usage history.

In at least some embodiments, the retrieved data is presented in a tab-delimited text file.

In some embodiments, the invention is implemented via a stand-alone instruction execution platform interconnected with other platforms or data stores by a network, such as a corporate intranet, a local area network, or the internet. A computer program product or computer program products contain computer programs with various instructions to cause the hardware to carry out, at least in part, the methods and processes of the invention. Data sets may include any data stores, such as those containing process management data, project management data, unit costing data, associate performance data, and Hoshin goal setting data. Any comparisons may be made using the data sets. Data sets may be stored locally or accessed over a network.

BRIEF DESCRIPTION OF THE DRAWINGS

Figure 1:
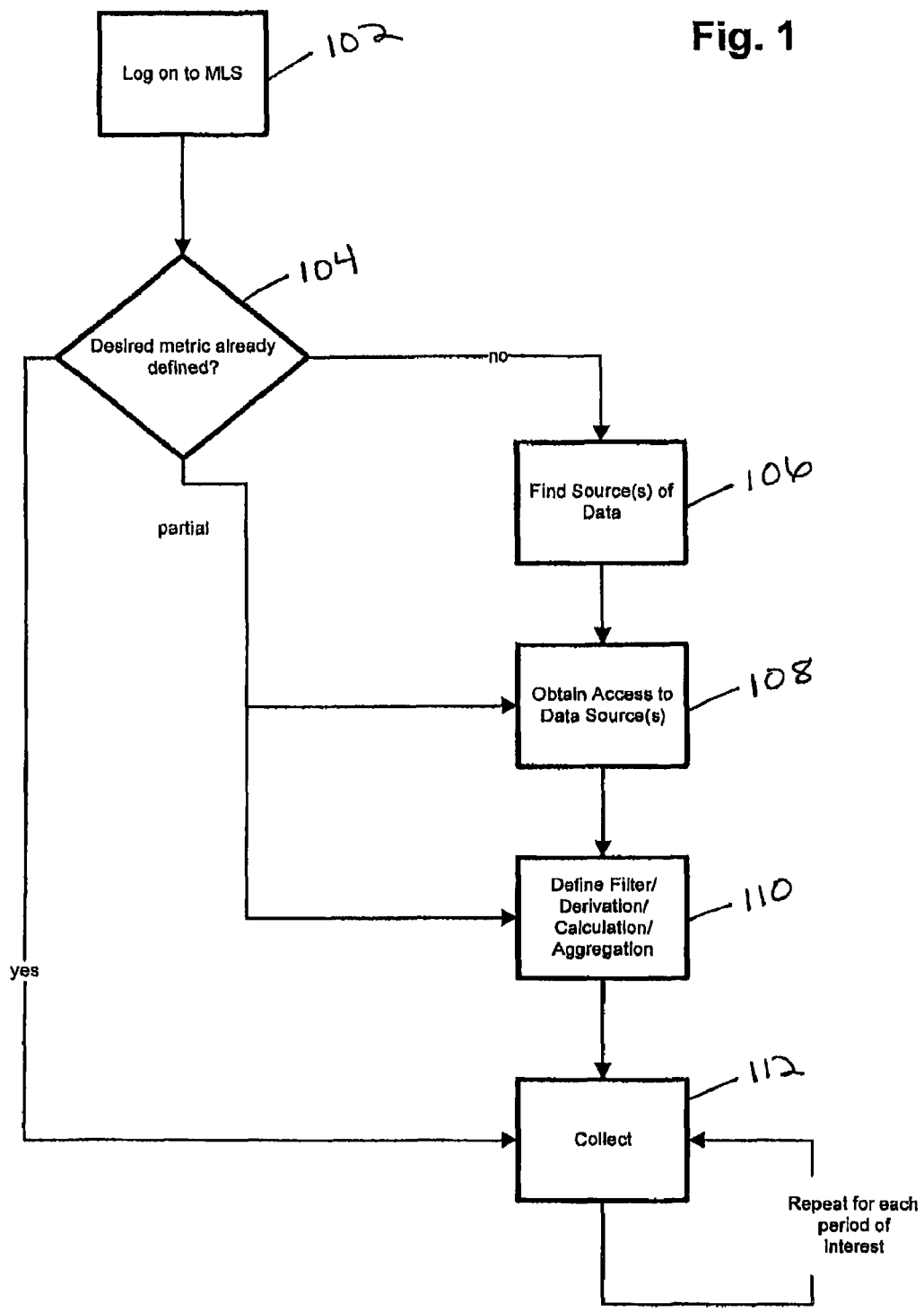

Having thus described embodiments of the invention in general terms, reference will now be made to the accompanying drawings:

FIG. 1 is a flowchart that illustrates a method of using a metrics library system according to example embodiments of the invention.

Figure 2:
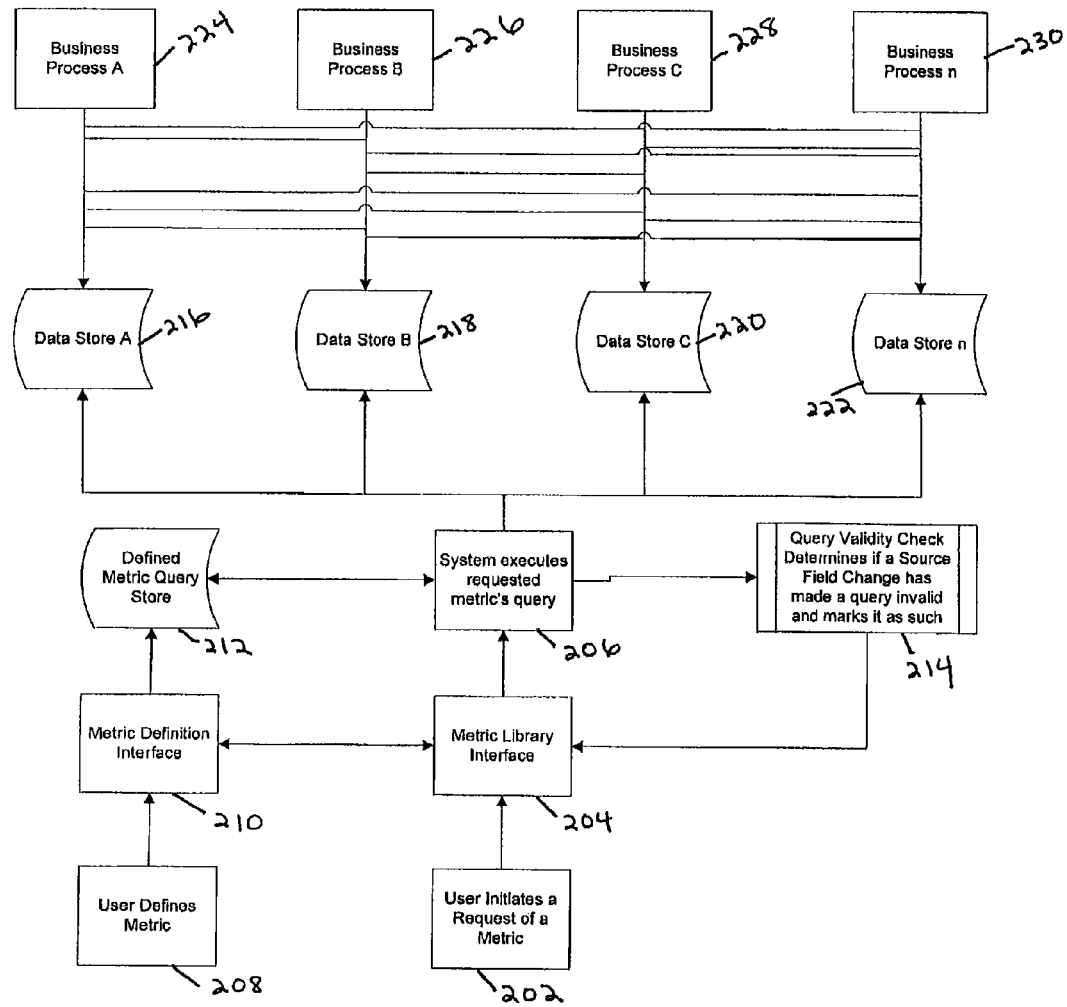

FIG. 2 is a flowchart that illustrates an overview of a metrics library system according to example embodiments of the invention.

Figure 3A:
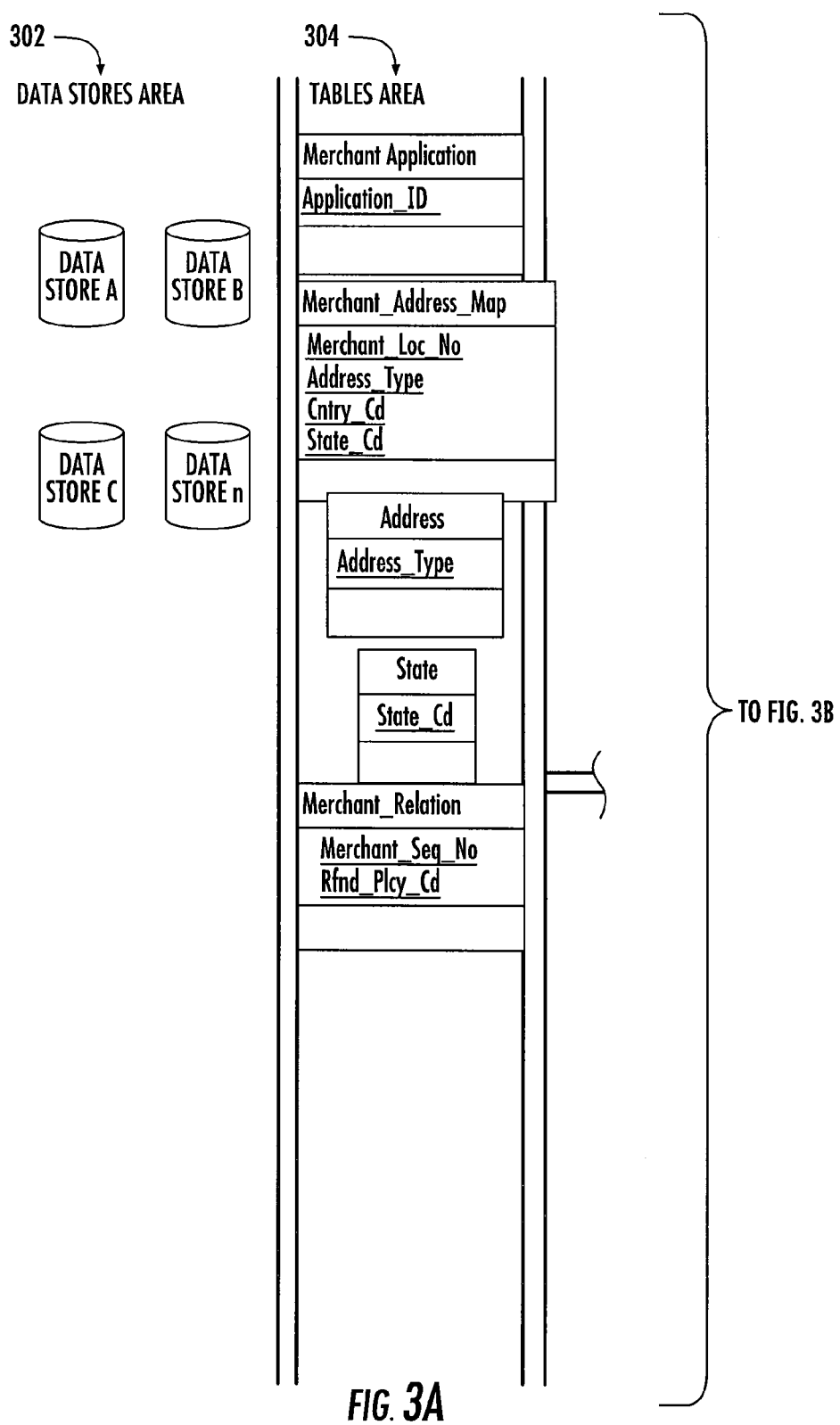
Figure 3B:
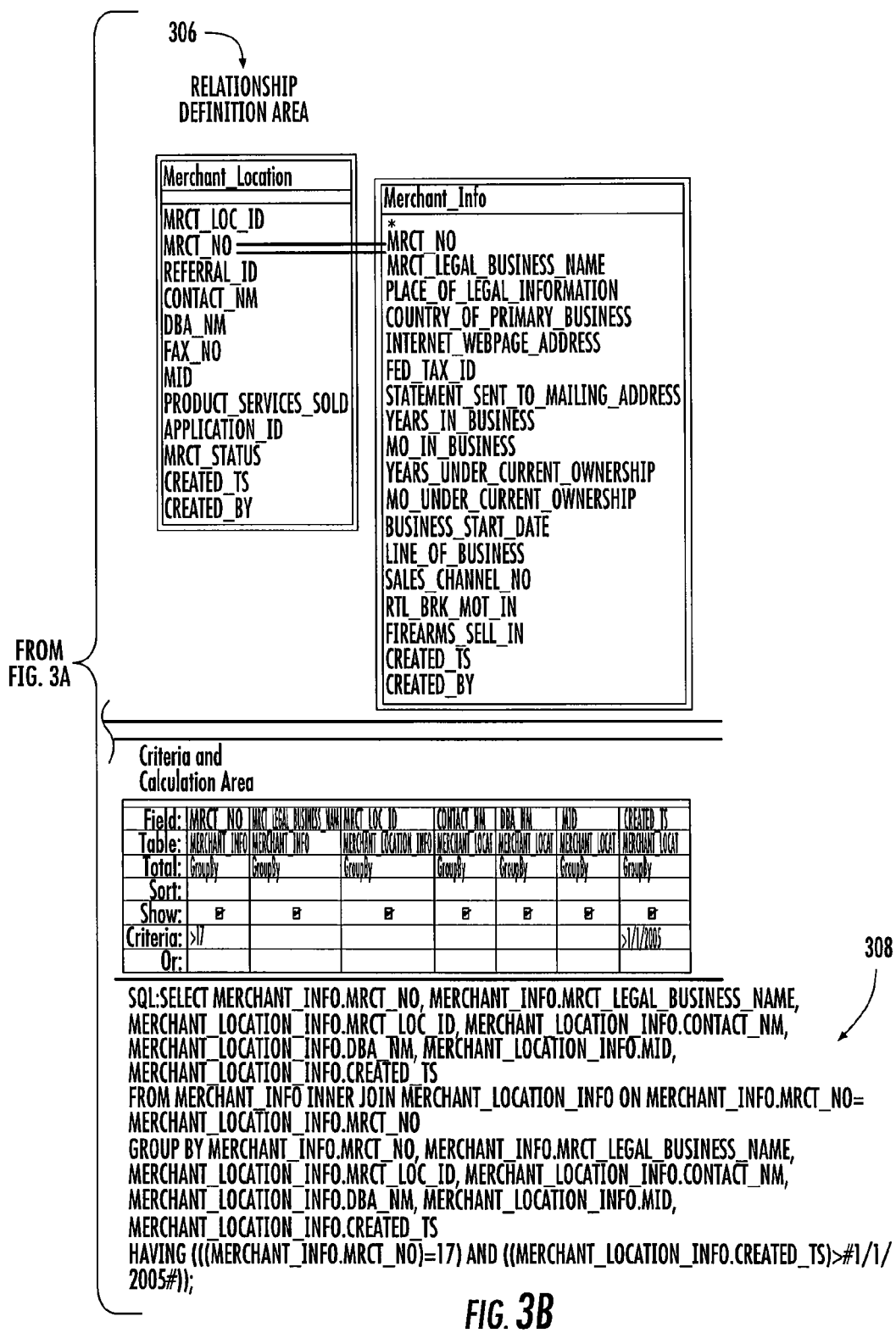

FIGS. 3A and 3B are an exemplary presentation of the concept behind the query definition interface according to example embodiments of the invention.

Figure 4:
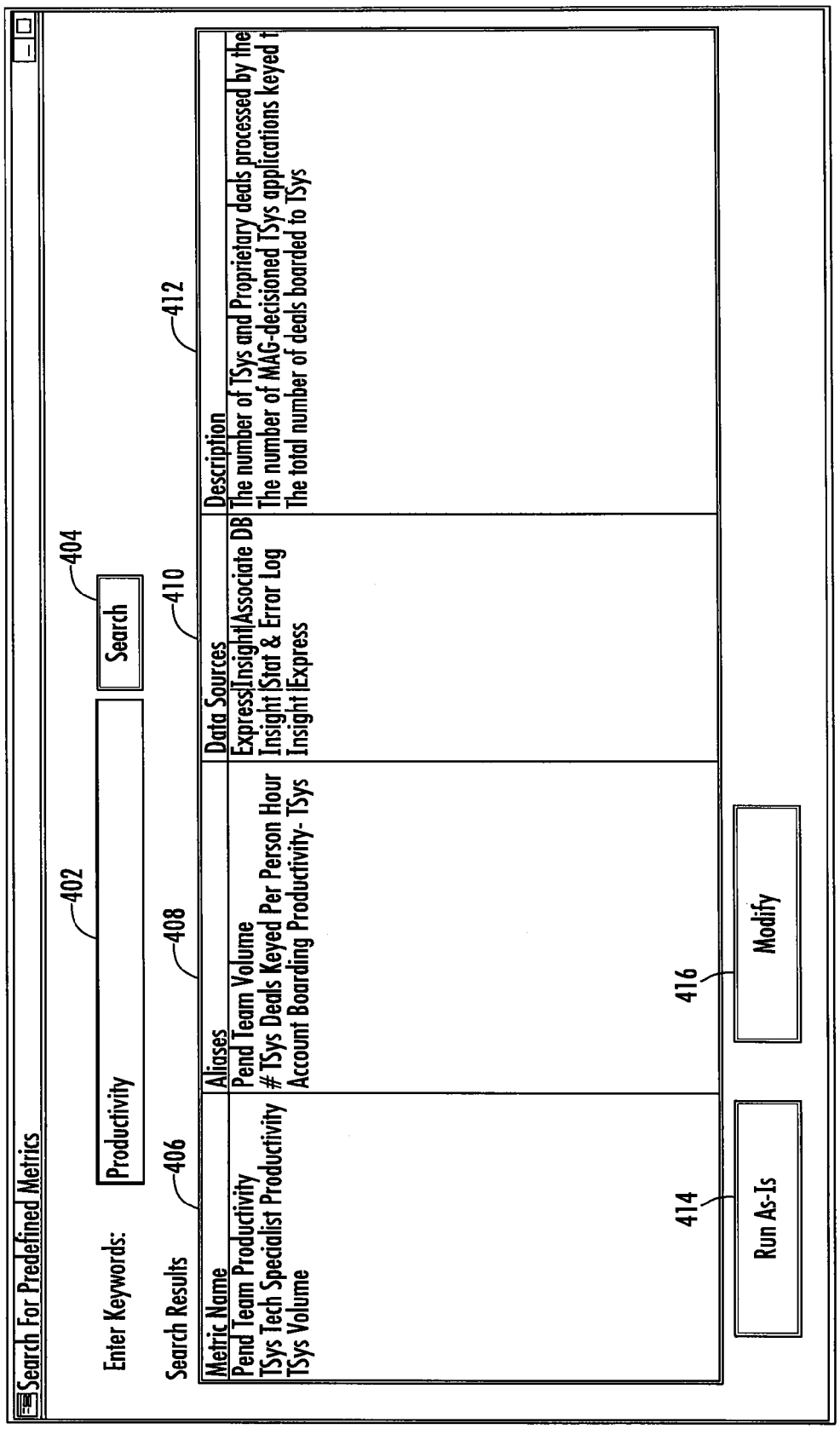

FIG. 4 presents an example screenshot of a library search interface according to example embodiments of the invention.

FIG. 5 presents an example screenshot of a library usage statistics interface according to example embodiments of the invention.

Figure 6:
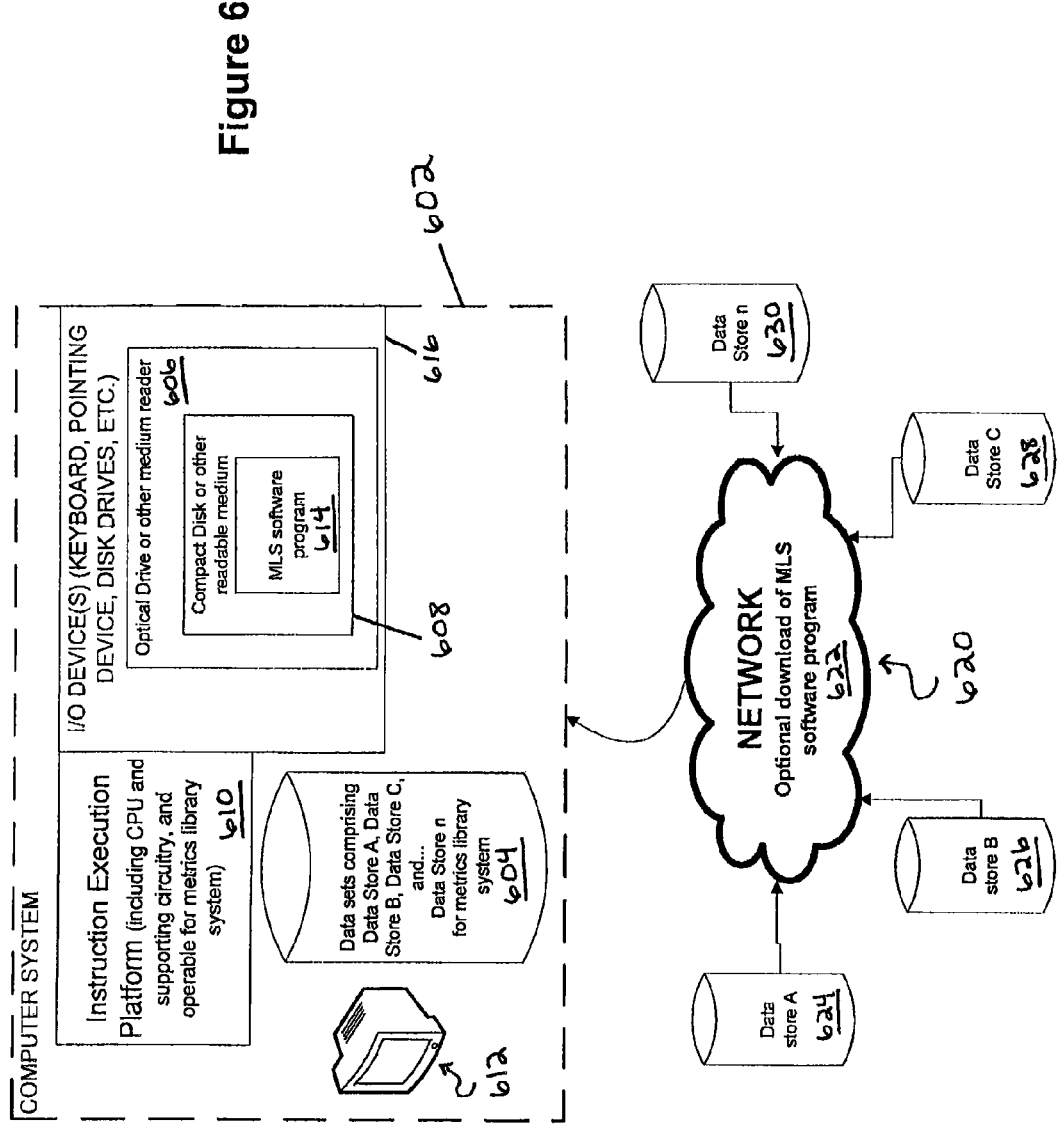

FIG. 6 is a system block diagram according to example embodiments of the invention.

DETAILED DESCRIPTION OF THE INVENTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

As will be appreciated by one of skill in the art, various portions of the present invention may be embodied as a device, method, system, computer program product, or a combination of the foregoing. Accordingly, the present invention may partially take the form of a software embodiment (including firmware, resident software, micro-code, etc.) or an embodiment combining, in various portions, software and hardware aspects that may generally be referred to herein as part of a "system". Software and/or hardware may be utilized in combination with a device or method as described herein. Furthermore, embodiments of aspects of the present invention may take the form of a computer program product on a computer-readable medium having computer-usable program code embodied in the medium. Examples of aspects of the present invention that might take such form include aspects of electronic features such as sensors, electronic locks, electronic monitoring systems, etc.

Embodiments of the present invention are described below with reference to flowchart illustrations and/or block diagrams of methods and apparatus (systems), which may include computer program products. It will be understood that a block of the flowchart illustrations and/or block diagrams, and/or combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The computer program instructions may be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing some of the functions/acts specified in the flowchart and/or block diagram block(s). Alternatively, computer program implemented steps or acts may be combined with operator or human implemented steps or acts in order to carry out an embodiment of the invention.

The following description is based on an exemplary implementation of an embodiment of the invention for use in creating and storing complex search queries in a searchable repository, wherein other users can use, add to, refine or build from the metrics already defined without duplicating effort. Embodiments of the present invention provide a metrics library system (MLS) comprising a user interface for entering a user login, a metric definition interface, a metric query store, a query execution function, a metric library interface, at least two disparate data stores, and a user interface for directing data retrieved by the query execution function to a location specified by the user. In some embodiments, the user login is used to establish the user's level of access to data.

As used herein, the terms "query" and "metric" are highly related. A "metric" refers to a measurement that provides meaningful information. A "query" refers to a search statement set up to define the metric in such a way that executing the query will retrieve information pertinent to the metric. A metric must be "defined" within the MLS so that its characteristics are identified and described in a way that is understandable to a user of the MLS. The defined metric then essentially becomes the query. In a strictly technical sense, the "query" refers to the defined metric as it has been translated into a search string, such as, but not limited to, an SQL statement or other alternative search language such as, but not limited to, D, Common Query Language (CQL), and QUEL. The term "metric query store", as used herein, refers to the part of the MLS that contains data regarding all existing metrics and their corresponding queries. This provides a user of the MLS with both a description of the metrics and with the actual query that corresponds to each metric. Thus, if a user identifies a metric that defines or includes his or her subject of interest, the user can then execute the query that corresponds to that metric.

The MLS provides a metric definition interface to the user. The metric definition interface provides the user with the ability to view and select existing defined metrics and their corresponding queries for execution. The metric definition interface further provides the user with the ability to modify an existing defined metric and then execute the correspondingly modified query. Still further, the metric definition interface allows the user to know if no one has defined his or her metric of interest before. The user can then define a new metric, which will be stored in the MLS. Further discussion of the metric definition interface is found, for example, in the discussion of FIG. 4.

The MLS provides a metric library interface that allows a user to learn what metrics fellow users (the "user community") have already defined in a particular area of interest. In addition, the library interface allows the user to learn the "real-world" descriptions of the tables and fields in the data stores as defined by the user community.

The MLS of embodiments of the present invention provides methods and systems for use in creating and storing complex search queries in a searchable repository. An embodiment of the invention can be implemented with existing data stores and data architectures, and does not require making changes to existing data structures. The MLS is a way to share common-interest data, such as research information, from multiple sources across functions in a non-warehoused, disparate-system environment.

Organizations often manage processes by gathering statistics on productivity, accuracy, timing, and other metrics. They also manage employees who perform tasks associated with the processes. Further, they set prices for goods and services based in part on the cost of the processes involved in producing those goods and services. From time to time they launch projects designed to improve one or more aspects of the processes. Employees responsible for gathering, sorting, filtering, and analyzing this data generally span many functions, such as line-level management, executive management, product and pricing, quality assurance, customer relationship management, project management, process design, engineering, human resources, and six sigma functions.

Some organizations have evolved to the point of building data warehouses, relational links between data sources, and searchable metadata interfaces to allow users to perform ad hoc research queries. In organizations where no such tools exist, and the sources of the data are not linked in any way, each of the individuals is left to navigate the data sources as best he or she can. When the data paths are too numerous, the premium shifts from knowing how to get the answer to knowing who knows the answer. This delays decision making, increases the cost of attrition, and often leads to gut level decisions uninformed by fact. As used herein, the terms "data store" and "data source" may be used interchangeably.

In some embodiments, the MLS serves to make all of the data collected and stored in an organization available for searches and retrieval. Access to the data may be limited according to a specific user's assigned level of access, but in at least some embodiments all of the data may be made available for searching. The MLS achieves a "linkage" of all data stores without requiring a complete overhaul of the data and/or system architecture.

The MLS gives users across all subgroups of an organization consistent access to the organization's data stores. Further, the MLS makes the most efficient use of all users' time by storing queries after they are created so that they can be used by later users. The MLS further increases efficiency within an organization by capturing the history of usage of the metrics to enable knowledge of who needs to know what; which metrics are important to which people and why; and whether people and subgroups are asking the right questions when searching for information in the data stores.

The MLS of the present invention provides an interface between a user and disparate data sources, and provides a way to reveal the available data fields and tables for searching. The user interface provides a user with the option of searching for an existing metric definition to use as the search query, or of creating a new metric definition to use as the search query. The creation of a new metric definition can occur by taking an already existing metric definition and changing it or adding to it to create a new modified metric definition. In this respect, the metrics library again increases the efficiency of data retrieval by making use of already existing metric definitions.

If a user is creating a new metric definition, or modifying an already existing metric definition, the MLS interface provides an editor for specifying the data fields, search criteria, relational linkages, calculations, etc. The metrics can be defined as closed or parametric, which means that subsequent users are prompted for one or more variables when running the query. For example, a query can be defined to include variables (also called variable parameters or parameters) such as a date range. In at least some embodiments, variable parameters within a query can be adjusted by the user, but such adjustments are not considered to be changes in the definition of the metric. The MLS will prompt the user to set parameters prior to executing a query that includes variables.

In some embodiments, the output of each query run is a tab-delimited text file that can be imported into another computer software program or tool, such as Microsoft Excel or Microsoft Access, for additional analysis and manipulation on the user's local computer.

Each time a particular query is accessed but not run is logged as a "search miss". Each time a query is accessed and used to build another query is logged as a "search partial hit" and a link is established between the new and existing queries. Each time a query is accessed and run as-is, or with new parameters when prompted, it is logged as a "search hit".

FIG. 1 is a flowchart depicting an overview of the MLS in at least some embodiments. A user logs onto the MLS 102. The user then determines whether the desired metric is already in existence in the MLS 104. The user may opt to create an entirely new query, build on an existing query, or simply run an existing query.

If the user opts to create an entirely new query, he or she must identify the data store(s) containing the data of interest 106. The user must obtain access to the data store(s) 108. The user defines the "filter", or the limitations of the query, then derives, calculates and aggregates the data 110. Once the data has been aggregated, it is collected 112 and delivered to the user in a file format of the user's choice.

If the user opts to build on an existing query, he or she can jump into the process further downstream from identifying the source of data 106. The user may start at either obtaining access to the data store(s) 108 or at defining the "filter", or the limitations of the query, then deriving, calculating and aggregating the data 110. Where in the process the user will join in building on the existing query depends at least in part on the similarity between the existing query and the new query being defined. Once the data has been aggregated, it is collected 112 and delivered to the user in a file format of the user's choice.

If the user opts to use an existing query, he or she need only run the query and collect the results 112 in a file format of the user's choice.

FIG. 2 is a flowchart depicting the MLS in at least some embodiments. Each user of the metrics library system will have an assigned login. The assigned login will correspond to the user's approved level of access to data, as not all users will have access to all data. The system designer or administrator may adjust user level of access as appropriate, and those of ordinary skill in the art would understand how to do this without changing the scope of the present invention.

Once a user logs in to the MLS, the system 206 goes to the data stores 216, 218, 220 and 222 and pulls the data out to be temporarily stored in the metrics library system 206. The data that is pulled out of the data stores is restricted for searching according to the user's approved level of access. The fact that the data is imported into the metrics library system means that no user of the metrics library system ever has access to the original data stored in the data store, thus maintaining the integrity of each business process's data in its original data store.

After logging in, a user of the MLS may either initiate a request of a specific pre-existing metric 202 or define a new metric 208. If the user initiates a request of a metric, the user interfaces with the main metric library interface 204 and from there can view the already existing metrics and their corresponding definitions. If the user does not see a metric that defines the query he or she would like to run, the user may then go to the metric definition interface 210. Once at the metric definition interface 210, the user will be able to create a new metric definition or modify an existing one. A user may also enter the MLS and go directly to the metric definition interface 210 if they wish to create an entirely new metric.

If the user elects to go to the metric definition interface 210, the user can then access the defined metric query store 212. In at least some embodiments, the data maintained in the metric query store 212 may comprise query name, query keywords, query text description, data stores (or data sources) used, data tables used, data fields used, external relationships (or "joins") created, search criteria and filtering, and raw SQL string created to actually perform the search. These data are determined when the query, or metric definition, is created.

Once the metric definition, or query, has been sufficiently defined, the system executes the requested query. In some embodiments, the query will pass through a query validity check 214 to determine if a source field change has made a query invalid. If so, the query is marked as "invalid". As a query is utilized by multiple successive users, the query and the metric definition will become more refined and more completely characterized in a way that is useful to a plurality of users.

If a query is valid and the query is successfully executed, the specified data are searched, according to the user's assigned level of access. Data from any of data stores 216, 218, 220 and 222 may be searched for a particular query. As noted above, the data from data stores 216, 218, 220 and 222 is pulled into the MLS for searching, leaving the original data as stored in the data stores intact and untouched by users of the MLS. Thus, the business processes 224, 226, 228, and 230 can proceed with business as usual in collecting and storing data, with no interference from the MLS and no fear that interfacing for organization-wide searches by way of the MLS could contaminate the integrity of their data.

The following description is based on an exemplary implementation of an embodiment of the invention in a financial institution. As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

In general, and as an exemplary embodiment, an MLS for use in a financial system is described in more detail as follows. The example of a use of the MLS in a financial institution is not meant to be limiting in any way, as the invention as described herein may be utilized within any system wherein data is collected and stored in disparate environments but needs to be searched as a single entity.

A user of the MLS must log into the system. The MLS presents a login screen, and the user enters an identifier (ID) and a password. The MLS presents options to search the existing queries or to define a new metric. The user chooses to create a batch login file from the menu, and the MLS presents the batch login graphical user interface (GUI). The user enters ID and password information applicable to each data store and opts to save all ID and password information. The MLS stores the information for accessing each data store and then returns the user to the main options screen.

The batch login option allows the user to only enter user ID and password information for each data store once, and then the MLS can save the information. For example, if a user wants to use a query that accesses four data stores, the user may have as many as four different sets of IDs and passwords required to gain access to those four data stores. The system could put up a series of four prompts for that information when accessing that query, but that would be inefficient if the data stores are to be accessed more than one time by the user. Instead, the system allows the user to store the ID and password information once, and the system can thereafter access the data stores without having to prompt for the user ID and password information again. Thus, in at least some embodiments, the MLS creates a password keychain for the user.

In one example, after logging in, a user wishes to create a completely new metric definition, or query. The metrics library system presents a login screen, and the user enters an ID and password to log into the system. The MLS then presents options to the user regarding what query to submit. The user can elect to use an existing query, modify an existing query, or create a new query. In this example, the user chooses to define a new metric and create a new query. The MLS presents a query definition GUI, as shown in FIGS. 3A and 3B, that allows the user to define the query using graphical representations of the data and without having to know how to compose a query in a particular system language, such as SQL.

The MLS uses the user login information to reference all logins for that user for each known data store, and gathers the available data store information shown in the data stores area 302. If there are data stores that the user is not authorized to access, the data stores will be shown but the user will not be able to take any action with respect to the unavailable data stores. The user then selects the data stores he or she wishes to search.

The MLS displays available data tables from the selected data store in the tables area 304 of the query definition GUI. The user drags new tables to the relationship definition area 306 and creates any necessary joins or field name aliases. A join tells how the data in two tables relate to each other. The MLS translates the graphical representation of the relationships and selected fields into an SQL statement and displays the statement in the SQL area 308.

Once the SQL statement has been created, the user can select to run the query. The MLS presents a dialog box to provide the user with the ability to save the results of the query on their local computer. The user can then enter the desired name for the results file and also enter a location for saving the results file on their computer. The MLS runs the query and saves the result to the specified file. The MLS then displays the query definition GUI again in case the user wants to further modify the query after seeing the search results.

In another example, a user wishes to create a new metric definition, or query, based on an existing metric definition. The metrics library system presents a login screen, and the user enters a unique identifier and password to log into the system. The MLS then presents options to the user regarding what query to submit. The user can elect to use an existing query, modify an existing query, or create a new query. In this example, the user chooses to search existing queries. The MLS presents a library search GUI, as shown in FIG. 4, and there the user enters keyword(s) in the keyword field 402 and clicks the "search" button 404. The MLS retrieves and presents a list of all metrics, or queries, that include one or more keyword matches. The MLS list of metrics includes metric name 406, aliases 408, data sources 410, and descriptions 412 for each metric.

The user selects from the list of metrics a metric he or she thinks may come close to meeting the need of their current inquiry and opts to modify it by clicking on the "modify" button 416. The MLS logs the selection of that metric and the option chosen for usage statistics purposes, then presents the query definition GUI (as shown in FIG. 3) with the selected metric.

The MLS uses the user login information to reference all logins for that user for each known data store, and gathers the available data store information shown in the data stores area 302. If the selected metric includes data stores that the user is not authorized to access, the data stores will be shown but the user will not be able to take any action with respect to the unavailable data stores. The user then selects the additional data stores he or she wishes to search, if necessary.

The MLS displays available data tables from the selected data store in the tables area 304 of the query definition GUI. The user drags new tables to the relationship definition area 306 and creates any necessary joins or field name aliases. The MLS translates the graphical representation of the relationships and selected fields into an SQL statement and displays the statement in the SQL area 310.

Once the SQL statement has been created, the user can select to run, or execute, the query. The MLS presents a dialog box to provide the user with the ability to save the results of the query on their local computer. The user can then enter the desired name for the results file and also enter a location for saving the results file on his or her local computer. The MLS runs the query and saves the result to the specified file. The MLS then displays the query definition GUI again in case the user wants to further modify the query after seeing the search results.

In addition to enabling searches of stored data across disparate data environments, the MLS also provides information as to who is using what data within the system. The MLS captures this information whenever a user logs into the system.

In at least some embodiments, an MLS user can see the access statistics in the following way. The system presents a login screen and the user enters an ID and password. The MLS then presents options to search existing metrics or to define a new metric. A further option on the menu is an option to view library statistics. When the user presents the view library statistics option, the MLS presents the usage stats (or statistics) GUI as shown in FIG. 5.

From the usage stats GUI, the user selects a metric from a dropdown menu showing all of the metrics 502. The MLS presents statistics and details relating to the selected metric, including metric name 504, aliases 506, number of times the metric has been accessed 508, number of times metric was used as is 510, and number of times metric was modified before use 512. Details 514 presented may include user ID, date, time and a log of search hits and misses as represented by the "yes" and "no" entries, respectively.

The user can then choose to export data relating to the metric from the MLS to another analysis tool, such as Microsoft Excel. The MLS presents a dialog box in which the user enters the desired name and location to be assigned to the exported file. The MLS exports data as directed and returns to the usage stats GUI.

In a specific example of the present invention, the MLS presents a login screen. A user enters his or her user ID and password. The MLS presents options to search existing metrics or to define a new metric.

The user chooses to search the existing metrics and the system presents a library search graphical user interface (GUI). The user enters the keywords "pended", "applications", and "missing documentation" and clicks the search button.

The MLS conducts a search using the keywords entered and retrieves metrics entitled "Monthly pended applications by reason code", "Pend team SLA (Service Level Agreement) by reason code", "Monthly applications pended for missing documentation by sales rep", and "Reason code pareto".

In this example, the user selects the metric "Monthly pended applications by reason code" and opts to modify the existing metric. The MLS logs the metric selection and the "modify" option chosen for usage statistics purposes, then presents the query definition GUI with the selected metric. The query as generated by the MLS would be as follows:

SQL: SELECT [Sales Reps].[Sales Rep Code], Count ([Pended Apps].[Application ID]) AS [CountOfApplication ID]
FROM [Sales Reps] INNER JOIN [Pended Apps] ON [Sales Reps].[Sales Rep Code]=[Pended Apps].[Sales Rep Code]
GROUP BY [Pended Apps].[Date Received], [Pended Apps].[Pend Reason], [Sales Reps].[Sales Rep Code]
HAVING (((([Pended Apps].[Date Received])>"Start Date:") And (([Pended Apps].[Date Received])<"End Date:")) AND ((([Pended Apps].[Pend Reason])="2")) ORDER BY [Pended Apps].[Pend Reason].

The MLS takes the user login information, references all logins for that user for each known data store, and gathers the available data store information shown in the data stores area. The user modifies the query by adding the field "document missing", adjusting the date parameter to search a new date range, and adjusting the query to produce counts instead of an enumeration of the records. In other words, instead of showing all of the "document missing" records with all of the corresponding fields, the result shows only "document missing" in the reason code field and a count of the records.

The MLS translates the graphical representation of the changes into an SQL statement such as the one shown above and displays it in the SQL area. The user then selects the "run" menu to execute the query. The MLS presents a common dialog box to provide the user the ability to save the results of the query on the user's local machine. The user can choose the name of the file and in this example chooses "February 2009 Missing Doc Pends by Type-Count.xls".

The MLS runs the query and saves the results to the specified file. The MLS displays the query definition GUI again so that the user can further modify the query if desired.

The user selects the option to save the metric as "counts of Applications Pended for Missing Documentation by Type of Document Missing" and enters a description of the metric, including data sources, tables, and fields used.

FIG. 6 is a system block diagram according to example embodiments of the invention. FIG. 6 actually illustrates two alternative embodiments of the invention. System 602 can be a workstation or personal computer. System 602 can be operated in a "stand-alone" mode. The system includes a fixed storage medium, illustrated graphically at 604, for storing programs and/or macros which enable the use of an embodiment of the invention. In a stand-alone implementation of the invention, data store 604 can include the data sets which are necessary to implement an embodiment of the invention. For example, data imported from the external data stores can be stored in data store 604 for use in the invention. In this particular example, the input/output devices 616 include an optical drive 606 connected to the computing platform for loading the appropriate computer program product into system 602 from an optical disk 608. The computer program product includes a computer program or programs with instructions or code for carrying out the methods of the invention. Instruction execution platform 610 of FIG. 6 includes a microprocessor, or central processing unit (CPU), and supporting circuitry and can execute the appropriate instructions and display appropriate screens on display device 612.

FIG. 6 also illustrates another embodiment of the invention in which case the system 620 which is implementing the invention includes a connection to data stores from which data from data store A 624, data store B 626, data store C 628 and data store n 630 can be retrieved. The connection to the data stores or appropriate databases can be formed in part by network 622. The connection to the data stores or appropriate databases can be formed in part by network 622, which can be an intranet, virtual private network (VPN) connection, local area network (LAN) connection, or any other type of network resources, including the internet. Data sets can be local, for example on data store 604, or stored on the network, for example in data store 624, 626, 628, or 630. The MLS imports data from disparate data stores (for example, data stores 624, 626, 628 and 630) and enables searching of the imported data.

A computer program which implements all or parts of the invention through the use of systems like those illustrated in FIG. 6 can take the form of a computer program product 614 residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and stored in a computer memory.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A metrics library system including a CPU and computer program code, wherein the computer program code implements creation and storage of complex search queries in a searchable repository, the system comprising:
a user interface configured to allow a user to login into a metrics library system;
a metric definition interface, accessible after the user login, configured to allow the user to identify existing metrics and associated queries, identify existing metrics and modify the associated queries, and create new metrics and add the associated queries; wherein the metrics define a type of measurement data and the associated queries retrieve the measurement data related to the metric from one or more disparate data stores;
a defined metric query store, accessible via the metric definition interface, configured to allow the user to identify a defined metric of interest and query information for retrieving the measurement data related to the defined metric of interest; wherein the user identifies one or more disparate data stores from which a query searches for the defined metric of interest;
a query execution function, wherein the query information associated with the defined metric of interest is used to retrieve the measurement data from the one or more disparate data stores for the defined metric of interest;
a metric library interface, configured to execute the query associated with the defined metric of interest to retrieve the measurement data related to the defined metric of interest; wherein each time one of the queries is accessed and not run historical data is stored that the query is a searched miss, wherein each time one of the queries is accessed and modified historical data is stored as a searched partial hit, and wherein each time one of the queries is accessed and run historical data is stored as a search hit; and
a user interface configured to direct the measurement data retrieved by the query execution function to a location specified by the user.

2. The metrics library system of claim 1, wherein the user login is used to establish the user's level of access to the measurement data, such that the user is only able to select the one or more disparate data stores that are available based on the user's level of access.

3. The metrics library system of claim 1, wherein the query information in the metric query store comprises at least one of query name, query keywords, query text description, data sources used, data tables used, data fields used, external relationships created, criteria and filtering information, and raw SQL string.

4. The metrics library system of claim 1, further comprising a metrics usage history interface; wherein the metrics usage history interface is configured to allow the user to identify the metrics and queries accessed and used by various users.

5. The metrics library system of claim 1, wherein the data retrieved by the query execution function is in a tab-delimited text file.

6. The metrics library system of claim 1, wherein the query information comprises at least one of query name, query keywords, query text description, data sources used, data tables used, data fields used, external relationships created, criteria and filtering information, and raw SQL string.

7. The metrics library system of claim 1, wherein the processor is further configured to execute the computer-readable program code to create a metrics usage history by capturing details of the use of the metrics library system; wherein the metrics usage history allows the user to identify the metrics and queries accessed and used by various users.

8. The metrics library system of claim 1, wherein when the associated queries of the existing metrics are modified, a link is established between the associated queries of the existing metrics and modified queries, such that the user is notified of both the associated queries and the modified queries when the user identifies the defined metric of interest.

9. A method for using a metrics library system comprising:
presenting a user login interface into a metrics library system; receiving a user login;
presenting a menu of defined metric options from which a user selects a defined metric option; wherein the defined metric option comprises the options of running an existing query, modifying and running an existing query, and creating and running a new query; wherein the metrics define a type of measurement data and the queries retrieve the measurement data related to the metrics from one or more disparate data; wherein in running the new query or modifying and running the existing query the user identifies one or more disparate data stores from which the query will search for the measurement data for the defined metric of interest;
receiving a selected metric from the user;
gathering one or more queries associated with the selected metric from the metrics library;
creating a search statement or using a pre-defined search statement for a query corresponding to the selected metric;
running the query; wherein each time the query is accessed and not run historical data is stored that the query is a searched miss, wherein each time the query is accessed and modified historical data is stored as a searched partial hit, and wherein each time the query is accessed and run historical data is stored as a search hit;
retrieving the measurement data according to the query from one or more disparate data sources; and
saving the retrieved measurement data to a location specified by the user.

10. The method of claim 9, wherein the user login is used to determine the user's level of access to the measurement data in the one or more disparate data stores and to restrict the measurement data gathered from the one or more disparate data stores based on the user's level of access.

11. The method of claim 9, wherein modifying or creating a query comprises specifying at least one of query name, query keywords, query text description, data sources used, data tables used, data fields used, external relationships created, criteria and filtering information, and raw SQL string.

12. The method of claim 9, further comprising creating a metrics usage history by capturing details of the use of the metrics library system; wherein the metrics usage history allows the user to identify the metrics and queries accessed and used by various users.

13. The method of claim 12, wherein the details of the metrics usage history include a time of search, a date of search, identification of the user who conducted the search, identification of the data stores searched, and identification of the defined metric and the query used to conduct the search.

14. The method of claim 9, wherein the retrieved data is a tab-delimited text file.

15. The method for using the metrics library system of claim 9, wherein when modifying and running the existing query, a link is established between the existing query and a modified query, such that the user is notified of both the existing query and the modified query when the user selects the defined metric of interest.

16. A metrics library system, comprising:
a memory device comprising computer-readable program code; and
a processor operatively coupled to the memory device, wherein the processor is configured to execute the computer-readable program code to:
allow a user to enter one or more keywords to search for metrics and queries related to the metrics that are stored in a metric library, wherein the metrics define a type of measurement data and the queries retrieve the measurement data related to the metrics from one or more data stores based on query information;
return one or more metrics in response to the one or more keywords;
allow the user to select the one or more metrics and the one or more associated queries and run the one or more associated queries to retrieve the associated measurement data;
allow the user to select the one or more metrics and create one or more new queries associated with the one or more metrics by adding the query information including the one or more data stores containing the measurement data related to the one or more queries;
allow the user to select the one or more metrics and the one or more associated queries and modify the one or more associated queries by adding or deleting the query information including the one or more data stores containing the measurement data related to the one or more queries;
allow the user to add a new metric to the metric library by entering a new metric name, defining the new metric, and creating a query by adding the query information including the one or more data stores containing the measurement data related to the one or more queries;
retrieve the measurement data by running the one or more queries; and
wherein each time one of the queries is accessed and not run historical data is stored that the query is a searched miss, wherein each time one of the queries is accessed and modified historical data is stored as a searched partial hit, and wherein each time one of the queries is accessed and run historical data is stored as a search hit.

17. The metrics library system of claim 16, wherein the processor is further configured to execute the computer-readable program code to utilize a user login to establish the user's level of access to the measurement data, such that the user is only able to select the one or more disparate data stores that are available based on the user's level of access.

18. The metrics library system of claim 16, wherein when allowing the user to modify the one or more associated queries, a link is established between the one or more associated queries and one or more modified queries, such that the user is notified of the one or more associated queries and the one or more modified queries when the user selects the one or more metrics.

19. A computer program product for a metrics library, the computer program product comprising at least one non-transitory computer-readable medium having computer-readable program code portions embodied therein, the computer-readable program code portions comprising:

an executable portion configured for allowing a user to enter one or more keywords to search for metrics and queries related to the metrics that are stored in a metric library, wherein the metrics define a type of measurement data and the queries retrieve the measurement data related to the metrics from one or more data stores based on query information;
an executable portion configured for returning one or more metrics in response to the one or more keywords;
an executable portion configured for allowing the user to select the one or more metrics and the one or more associated queries and run the one or more associated queries to retrieve the associated measurement data;
an executable portion configured for allowing the user to select the one or more metrics and create one or more new queries associated with the one or more metrics by adding the query information including the one or more data stores containing the measurement data related to the one or more queries;
an executable portion configured for allowing the user to select the one or more metrics and the one or more associated queries and modify the one or more associated queries by adding or deleting the query information including the one or more data stores containing the measurement data related to the one or more queries;
an executable portion configured for allowing the user to add a new metric to the metric library by entering a new metric name, defining the new metric, and creating a query by adding the query information including the one or more data stores containing the measurement data related to the one or more queries;
an executable portion configured for retrieving the measurement data by running the one or more queries;
wherein each time one of the queries is accessed and not run historical data is stored that the query is a searched miss, wherein each time one of the queries is accessed and modified historical data is stored as a searched partial hit, and wherein each time one of the queries is accessed and run historical data is stored as a search hit.

20. The computer program product claim 19, further comprising an executable portion for utilizing a user login to establish the user's level of access to the measurement data, such that the user is only able to select the one or more disparate data stores that are available based on the user's level of access.

21. The computer program product claim 19, wherein the query information comprises at least one of query name, query keywords, query text description, data sources used, data tables used, data fields used, external relationships created, criteria and filtering information, and raw SQL string.

22. The computer program product claim 19, further comprising an executable portion for creating a metrics usage history by capturing details of the use of the metrics library system; wherein the metrics usage history allows the user to identify the metrics and queries accessed and used by various users.

23. The computer program product for the metrics library of claim 19, wherein when allowing the user to modify the one or more associated queries, a link is established between the one or more associated queries and one or more modified queries, such that the user is notified of the one or more associated queries and the one or more modified queries when the user selects the one or more metrics.

* * * * *